United States Patent Office 2,914,382
Patented Nov. 24, 1959

2,914,382

PRODUCTION OF HYDROGEN PEROXIDE

William Raymond Holmes and Charles William Le Feuvre, Luton, Raymond Lait, St. Albans, and William Stanley Wood, Harpenden, England, assignors to Laporte Chemicals Limited, Luton, England, a British company No Drawing. Application May 20, 1954
Serial No. 431,294

Claims priority, application Great Britain June 9, 1953

2 Claims. (Cl. 23—207)

This invention relates to improvements in catalytic reduction and is particularly concerned with the reduction of alkylated or arylated anthraquinones to alkylated or arylated anthraquinhydrones or alkylated or arylated anthraquinols, and the application thereof to the manufacture of hydrogen peroxide.

It is already well known that hydrogen peroxide can be manufactured by a process employing the autoxidation of certain organic compounds. Thus, for example, United Kingdom specification No. 465,070 describes a process for the production of hydrogen peroxide in which an alkylated anthraquinone is hydrogenated in a solvent by means of hydrogen in the presence of a catalyst, to the corresponding alkylated anthraquinol, which after separation of the catalyst, is oxidised with oxygen to produce hydrogen peroxide and with regeneration of the alkylated anthraquinone. The process is thus cyclic as the alkylated anthraquinone is recycled to the hydrogenation stage after removal of the hydrogen peroxide by, for example, aqueous extraction.

Various catalysts have been proposed for use in the reduction stage, one of the most usual being activated nickel.

United Kingdom specification No. 508,081 mentions the use of active palladium as a hydrogenation catalyst in the reduction of anthraquinone to anthraquinol, but this specification does not disclose how the catalyst was prepared or used. United Kingdom specification No. 686,574 describes a process for the production of hydrogen peroxide in which an alkylated anthraquinone is hydrogenated in solution by means of hydrogen in the presence of a catalyst consisting of methallic palladium supported on activated alumina, the catalyst preferably containing 0.01% to 10% by weight of palladium and being suspended in the solution of the alkylated anthraquinone by means of a stream of hydrogen-containing gas. This specification also discloses the use of palladium catalysts on carriers of silica-alumina, coconut charcoal, active coal carbon, activated lignin carbon, decolourising vegetable carbon granular corundum, silica gel, barium sulphate and fibrous asbestos. According to this specification none of these carriers give as good results as activated alumina.

United States application Ser. No. 350,519, filed April 22, 1953, now abandoned, describes a process for preparing a palladium catalyst for use in the reduction of anthraquinones wherein a palladium salt is absorbed from a solution on to a carrier of alumina, preferably gamma alumina or gamma alumina monohydrate, which is then treated with a water-soluble metal hydroxide or carbonate to form a hydrated oxide or basic carbonate, which is thereafter reduced to metallic palladium.

It is an object of this invention to provide an improved catalyst for use in the hydrogenation stage of the process for the production of hydrogen peroxide by the cyclic reduction and oxidation of alkylated or arylated anthraquinones.

It has now been found according to this invention that satisfactory results in the hydrogenation of alkylated anthraquinones to alkylated anthraquinhydrones or alkylated anthraquinols can be obtained by using as a catalyst palladium deposited on a titanium dioxide carrier.

Accordingly, the present invention provides a process for the production of alkylated or arylated anthraquinhydrones or alkylated or arylated anthraquinols from alkylated or arylated anthraquinones wherein an alkylated or arylated anthraquinone in solution in a solvent or solvent mixture is reduced by means of hydrogen in the presence of a palladium catalyst material comprising metallic palladium deposited on titanium dioxide.

The present invention also includes a process for the manufacture of hydrogen peroxide by the hydrogenation of an alkylated or arylated anthraquinone in a solvent or solvent mixture by means of hydrogen in the presence of a palladium catalyst material comprising metallic palladium deposited on titanium dioxide to the corresponding alkylated or arylated anthraquinhydrone or alkylated or arylated anthraquinol, which after separation of the catalyst, is oxidised by means of oxygen or oxygen-containing gas to hydrogen peroxide, with regeneration of the alkylated or arylated anthraquinone.

Preferably the titanium dioxide employed is an "active titanium dioxide" which term as used herein refers to a hydrated or partially dehydrated titanium dioxide which has not been heated to a temperature greater than 1,000° C. It is preferable in the process of the present invention that the titanium dioxide is obtained in the form of a precipitated hard gel. It is already known that titanium dioxide can be obtained as a hard gel either by precipitation from a titanium salt solution, e.g. titanium chloride or titanyl sulphate with ammonia or other alkali, followed by washing and drying of the precipitate at a relatively low temperature, e.g. 100° C., followed possibly by a second drying at a higher temperature, e.g. of 350° C. or by coagulation of a colloidal solution of dispersed titanium dioxide by means of an alkali and/or heating, this being followed by similar washing and drying.

Owing to the property possessed by titanium dioxide of being obtained as a hard gel, it has also been proposed to use a titanium oxide sol to treat other catalyst carriers, the carrier then being heated to evaporate the titanium oxide sol which gives a hard gel, thus strengthening the other carrier.

From the above it will be understood that not all forms of titanium dioxide are equally suitable as catalyst support material for the purpose of the present invention. Thus, it has been found that a palladium catalyst prepared on a commercial calcined, pigment quality titanium dioxide, has a comparatively low activity in the hydrogenation reaction. It would in fact appear that the titanium dioxide should preferably be present in an active adsorptive form. This active form consists of a precipitated titanium oxide which has not been heated to a temperature greater than 1,000° C. Preferably the titanium oxide is a gel which has been prepared by precipitation of a titanium salt solution by an alkali compound in the cold with subsequent drying of the precipitate at a low temperature, or by coagulation of a colloidal solution of dispersed titanium dioxide by means of an alkali and/or heating followed by a similar drying. As the catalyst carrier must be sufficiently hard to resist abrasion, it is preferable from this point of view also that the titanium dioxide is in the form of a hard gel.

It is preferable for the palladium catalyst material used in the present invention to have a particle size corresponding to a screen aperture between 0.001" and 0.1" and to be suspended in the solution. The use of particle sizes corresponding to a screen aperture finer than 0.001" is undesirable because the catalyst then becomes difficult to filter from the solution, while catalyst particles corresponding to a screen aperture coarser than 0.1" are difficult to suspend in the solution. By using a catalyst of the above particle size it is possible to keep the catalyst in free suspension in solution without agitation other than that provided by the gas stream, thus lengthening the active life and reducing the danger of abrasion and disintegration.

The present invention is, of course, not restricted to the use of a palladium catalyst material having a particle size corresponding to a screen aperture between 0.001" and 0.1" as it is also possible to use the catalyst material in a coarser form which can, for example, be in a fixed bed through which the working solution and the hydrogen gas are passed, either in co-current or counter-current.

The palladium catalysts employed according to the processes of the present invention are suitable for use in free suspension in a hydrogenator and, as previously stated, the catalysts are of such particle size that separation from the solution may be substantially and simply achieved by means of filtration or a short period of settling. As previously stated the catalysts may also be of larger particle size so that they may be used in the form of a fixed bed.

Palladium catalysts deposited on active titanium dioxide may be reactivated after use by heating in a stream of oxygen, air or other oxygen-containing gas, for example at a temperature of 250° C. for oxidising the palladium to an oxide which may readily be reduced back to the metal by a reducing agent before use, or by hydrogen in the hydrogenator.

It is stated in United Kingdom specification No. 686,574 that the combination of metallic palladium supported on activated alumina appears to be unique as a hydrogenation catalyst for the reduction of alkylated anthraquinones to alkylated anthraquinols. It is also stated that catalysts consisting of palladium supported on other common materials well-known as active hydrogenation catalysts in other reactions, are almost completely inert and valueless for the present purpose. We have found, however, that this is not the case, as catalysts prepared from palladium supported on active titanium dioxide have as high an activity as those prepared from palladium supported on activated alumina. This is allustrated by the following comparative Examples 1 and 2.

*Example 1*

The catalyst was prepared as follows:
800 ccs. of a peptised $TiO_2$ solution containing 250 gm./litre of $TiO_2$ were prepared as described in United Kingdom specification No. 566,499 and this was diluted to 2 litres. Ammonia solution was then slowly added with constant stirring until a pH of 7 was reached. The resultant precipitate was filtered, washed with water and dried for 15 hours at 120° C. It was then crushed and sieved through 100 and 240 B.S.S. mesh screens. 40 gm. of the resultant titanium dioxide was the treated with 400 ccs. of a solution of sodium chlorpalladite containing 3.39 gm./litre of palladium chloride and 2.2 gm./litre of sodium chloride. After stirring the mixture was evaporated on a water bath. The mixture was also stirred while being evaporated otherwise the palladium would have been deposited on the sides of the vessel.

The catalyst (2.2% Pd) was suspended in a hydrogenator vessel in the presence of hydrogen at a pressure of 1.0 atmosphere in a solution containing 100 gm./litre of 2-ethylanthraquinone in a solvent mixture containing equal volumes of benzene and methylcyclohexanol acetate, the catalyst concentration being 10 gm./litre. The rate of formation of 2-ethyl anthraquinol was determined and the result expressed as the rate of formation of hydrogen peroxide per gram of catalyst per hour. With a palladium catalyst on hydrated titanium oxide, prepared as described above, the result was 4.5 gms. of hydrogen peroxide per gram of catalyst per hour. The comparable figure for a palladium catalyst on gamma alumina as described in United States application Ser. No. 350,519 was 2.5 gms. of hydrogen peroxide per gm. of catalyst per hour.

*Example 2*

A catalyst was prepared in the following way: 30 gm. of titanium dioxide prepared as described in the Example 1, were wetted with water. 30 millilitres of a palladous chloride solution, containing 20 gm./litre of palladium and 10 ccs./litre of concentrated hydrochloric acid was added and the slurry agitated for 2 to 5 minutes, the supernatant liquor then being substantially colourless. The solid was filtered at the pump and washed with 20 ccs. of water. It was then slurried with sufficient 5 gm./litre sodium hydroxide solution to give a pH of 9 to 10 (to Universal indicator) and then washed with water until the washings were pH 7 to 8. After being sucked dry at the pump, the solid was dried at 120° C. When tested as described in Example 1, the rate of formation of 2-ethyl anthraquinol with this catalyst, expressed as the rate of formation of hydrogen peroxide, was 5.5 gm. of hydrogen peroxide per gram of catalyst per hour.

Similar results can be obtained by reducing in gaseous hydrogen the palladium salt deposited on the carrier before it is introduced into the hydrogenator.

The following example illustrates how the process of the present invention for the manufacture of hydrogen peroxide may be carried into effect:

*Example 3*

The catalyst was prepared as described in Example 1.
A solution containing 50 gm. of 2-ethyl anthraquinone per litre of a solvent mixture of equal volumes of benzene and methyl cyclohexanol acetate, was passed through a hydrogenator vessel as described in United States application Ser. No. 330,453, filed January 9, 1953, now abandoned, and reduced to 2-ethyl anthraquinhydrone by a stream of hydrogen in the presence of the catalyst. After oxidising the 2-ethyl anthraquinhydrone back to the 2-ethyl anthraquinone, the hydrogen peroxide which was also formed was extracted from the solution with water and the organic solution returned to the hydrogenation stage, the rate of flow of solution being 4.4 litres/hr. In the hydrogenation stage 10 gm. of the catalyst was added to the hydrogenator and hydrogenation carried out until the catalyst was substantially completely de-activated. The total weight of hydrogen peroxide produced was 80 grams per gram of catalyst.

The reactivation of the catalyst may be effected as follows:

The de-activated catalyst was washed with benzene and heated in a stream of air for 18 hours at 250° C. After this treatment the catalyst was used again in the same manner as described above and this time the total weight of hydrogen peroxide formed was 93 gm. of hydrogen peroxide per gram of catalyst.

*Example 4*

120 ccs. of aqueous titanium tetrachloride solution containing 250 gm. of titanium tetrachloride per litre, were neutralised by adding sodium hydroxide solution (10 gm. NaOH/litre) with steady stirring until the pH reached 8. The precipitate was then washed at a filter pump and dried for 15 hours at 120° C. The solid was then ground and sieved between 100–240 mesh (B.S.S.).

100 ccs. of a solution containing 3.3 gm. per litre of palladium chloride and 4.4 gm. per litre of sodium chloride were added to 10 gm. of this support. The solution was stirred for 15 minutes, until it became almost colourless, the pH being kept below 7 by addition of dilute hydrochloric acid as necessary. The remaining solution was decanted, and the catalyst washed and dried at 120° C.

The catalyst was suspended in a hydrogenator vessel in the presence of hydrogen at a pressure of 1.0 atmosphere in a solution containing 100 gm. per litre of 2-tertiary butyl anthraquinone in a solvent mixture containing equal volumes of benzene and methyl cyclohexanol acetate, the catalyst concentration being 10 gm. per litre. The rate of formation of 2-tertiary butyl anthraquinol, expressed as the rate of formation of hydrogen peroxide, was 2.5 gm. of hydrogen peroxide per gram of catalyst per hour.

The activity of the catalyst employed in this invention is not adversely affected by the presence of hydrogen peroxide or oxygen in the working solution, so that no special precautions are necessary for removing them before the solution comes in contact with the catalyst. Also the present catalyst has a relatively long active life and can be easily regenerated.

The catalyst employed in this invention also has the advantage that it is in a hard form and is not easily abraded during the hydrogenation reaction.

Any alkylated or arylated anthraquinone with its corresponding alkylated or arylated anthraquinhydrone or alkylated or arylated anthraquinol can be used as the organic intermediates in this process for the manufacture of hydrogen peroxide. Examples of alkylated anthraquinone which may be used are 2-ethyl anthraquinone and 2-tertiary butyl anthraquinone.

Examples of solvents for the alkylated or arylated anthraquinhydrones or alkylated or arylated anthraquinols which may be employed are cyclohexanol acetate or propionate or methyl cyclohexanol acetate or propionate.

Examples of the other component of the solvent mixture which may be used are benzene or other liquid hydrocarbon such as toluene or xylene.

What we claim is:

1. A process for the production of reduction products of substituted anthraquinones selected from the group consisting of alkylated anthraquinhydrones, arylated anthraquinhydrones, alkylated anthraquinols and arylated anthraquinols which comprises reducing a substituted anthraquinone selected from the group consisting of alkylated anthraquinones and arylated anthraquinones by means of hydrogen in the presence of a palladium catalyst material comprising metallic palladium deposited on an at least partially hydrated titanium dioxide which has not been heated to a temperature greater than 1000° C.

2. A process for the manufacture of hydrogen peroxide which comprises hydrogenating a substituted anthraquinone selected from the group consisting of alkylated anthraquinones and arylated anthraquinones in at least one solvent by means of hydrogen in the presence of a palladium catalyst material comprising metallic palladium deposited on an at least partially hydrated titanium dioxide which has not been heated to a temperature greater than 1000° C. to form the corresponding anthraquinhydrone or anthraquinol, separating the catalyst and oxidising said anthraquinhydrone or anthraquinol in the presence of water by treatment with an oxidising gas to form hydrogen peroxide with regeneration of the substituted anthraquinone.

References Cited in the file of this patent

UNITED STATES PATENTS

| 1,111,502 | Schwarcman | Sept. 22, 1914 |
| 2,657,980 | Sprauer | Nov. 3, 1953 |
| 2,662,861 | Riblett et al. | Dec. 15, 1953 |
| 2,668,753 | Harris et al. | Feb. 9, 1954 |
| 2,739,042 | Corey et al. | Mar. 20, 1956 |

FOREIGN PATENTS

| 981,727 | France | Jan. 17, 1951 |

OTHER REFERENCES

Grant: "Hackh's Chemical Dictionary," 3rd edition, 1944, p. 858.